Sept. 13, 1932. W. FAIRCHILD 1,876,649
APPARATUS FOR DISPENSING
Filed March 6, 1929 7 Sheets-Sheet 1

Sept. 13, 1932. W. FAIRCHILD 1,876,649
APPARATUS FOR DISPENSING
Filed March 6, 1929 7 Sheets-Sheet 4

Sept. 13, 1932.   W. FAIRCHILD   1,876,649
APPARATUS FOR DISPENSING
Filed March 6, 1929   7 Sheets-Sheet 5

Patented Sept. 13, 1932

1,876,649

UNITED STATES PATENT OFFICE

WILLIAM FAIRCHILD, OF ALBANY, NEW YORK, ASSIGNOR TO A. P. W. PAPER CO., OF ALBANY, NEW YORK, A CORPORATION OF NEW YORK

APPARATUS FOR DISPENSING

Application filed March 6, 1929. Serial No. 344,848.

My invention relates particularly to apparatus for dispensing, but has relation especially to dispensing interfolded paper articles, such, for example, as paper towels.

The object of my invention is to provide an apparatus of the above kind which will very effectively deliver only one of the articles at a time, as, for example, an interfolded paper towel, and which, accordingly, may be used effectively with a coin-controlled delivery mechanism inasmuch as invariably only one of the paper towels will be delivered upon the insertion of a coin. In order to accomplish this purpose I have provided in the apparatus means for preventing the towel-delivery rolls from being spun by their own momentum, and have also provided means whereby the towel, which has been purchased by the insertion of the coin, cannot be grasped to an undue extent which, if permitted, would bring too great a force to bear, indirectly, upon the succeeding towel in the apparatus. Another object is to hold the towels tightly between the delivery rolls and yet with sufficient flexibility as to permit the ready withdrawal of the particular towel purchased. Still another object is to construct the towel delivery mechanism in the form of a composite removable unit. Also, another object is to provide means for preventing the introduction of coins when the apparatus has been emptied of the articles being dispensed.

While my invention is capable of being carried out in many different ways, for the purpose of illustration I have shown only one embodiment for carrying out the same in the accompanying drawings, in which—

Figure 9:
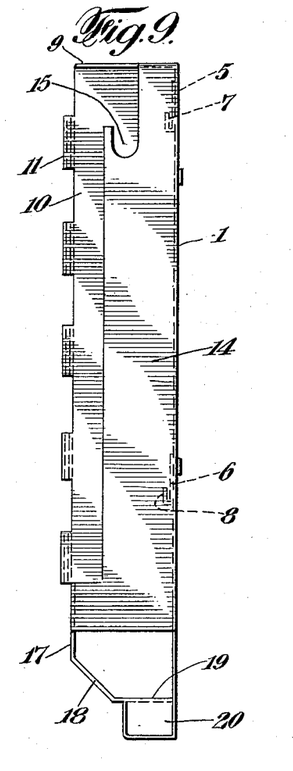
Fig. 9 is a side elevation of the same.
Figure 10:
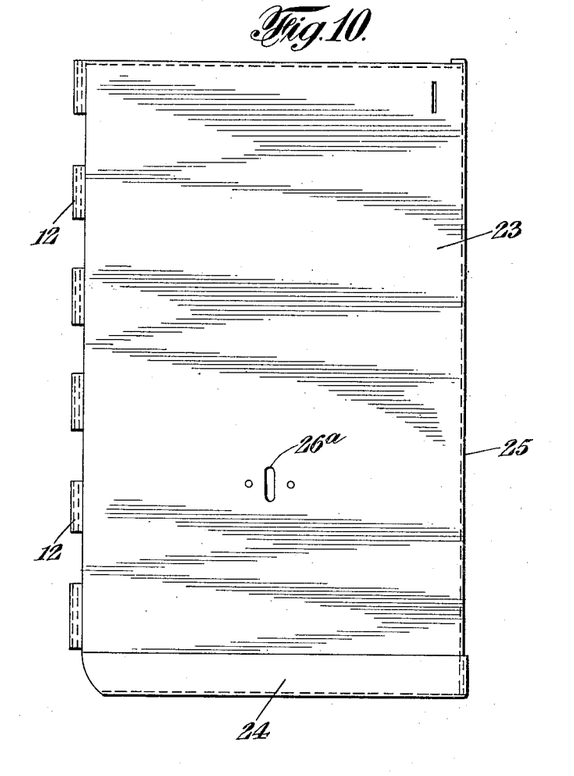
Fig. 10 is an elevation of the front portion of the cabinet.
Figure 11:
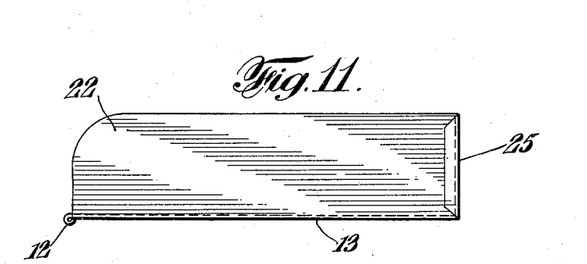
Fig. 11 is a plan view of the same.
Figure 12:
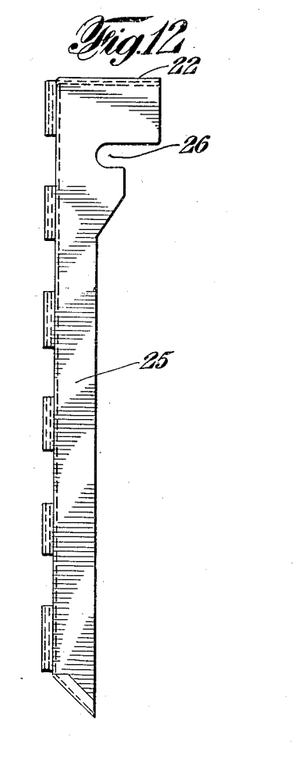
Fig. 12 is a side elevation of the same.
Figure 13:
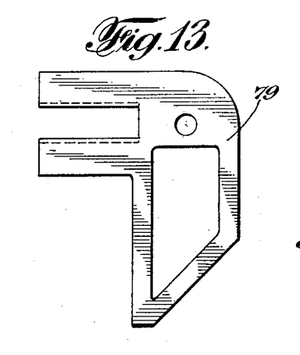
Fig. 13 is a side elevation showing the arrangement of each of the roll-supporting brackets.
Figure 14:
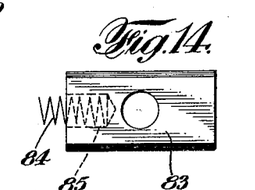
Fig. 14 is a plan view of one of the sliding bearings for the rear roll.
Figure 15:
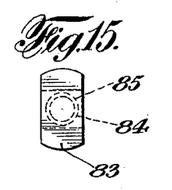
Fig. 15 is an end elevation of the same.
Figure 16:
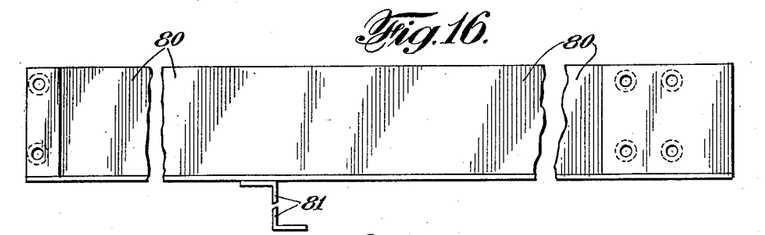
Fig. 16 is a front elevation of the transverse plate connecting the roll-supporting brackets.
Figure 17:
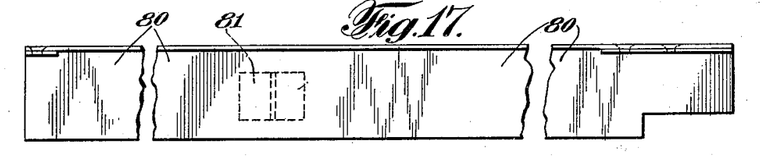
Fig. 17 is a plan view of the same.
Figure 18:
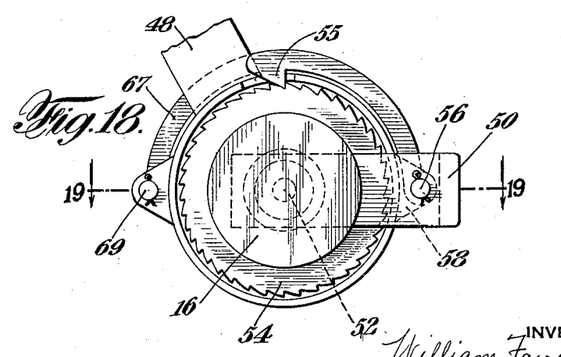
Fig. 18 is an end elevation of the manually operable device of the coin-controlled mechanism.
Figure 19:
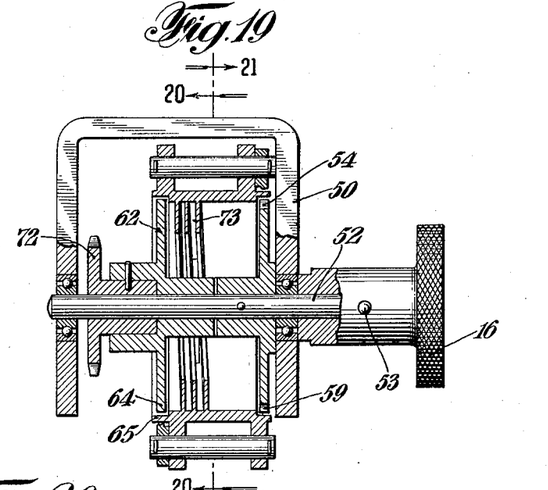
Fig. 19 is a section taken on line 19—19 of Fig. 18.
Figure 20:
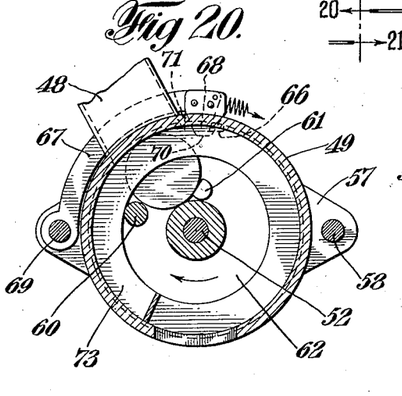
Fig. 20 is a section taken substantially on line 20—20 of Fig. 19.
Figure 21:
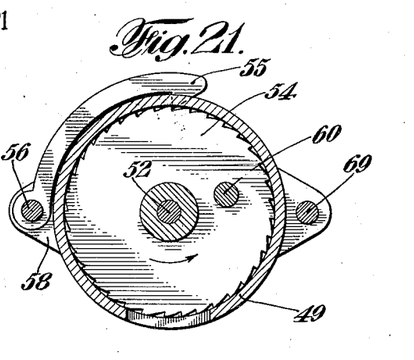
Fig. 21 is a section taken substantially on line 21—21 of Fig. 19.
Figure 22:
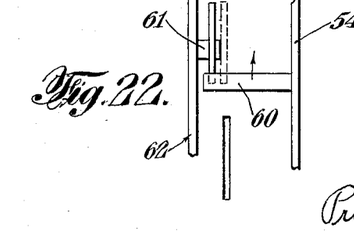
Fig. 22 is a diagrammatic view showing the relative position of the coin-operating pins.
Figures 23, 24, 25:
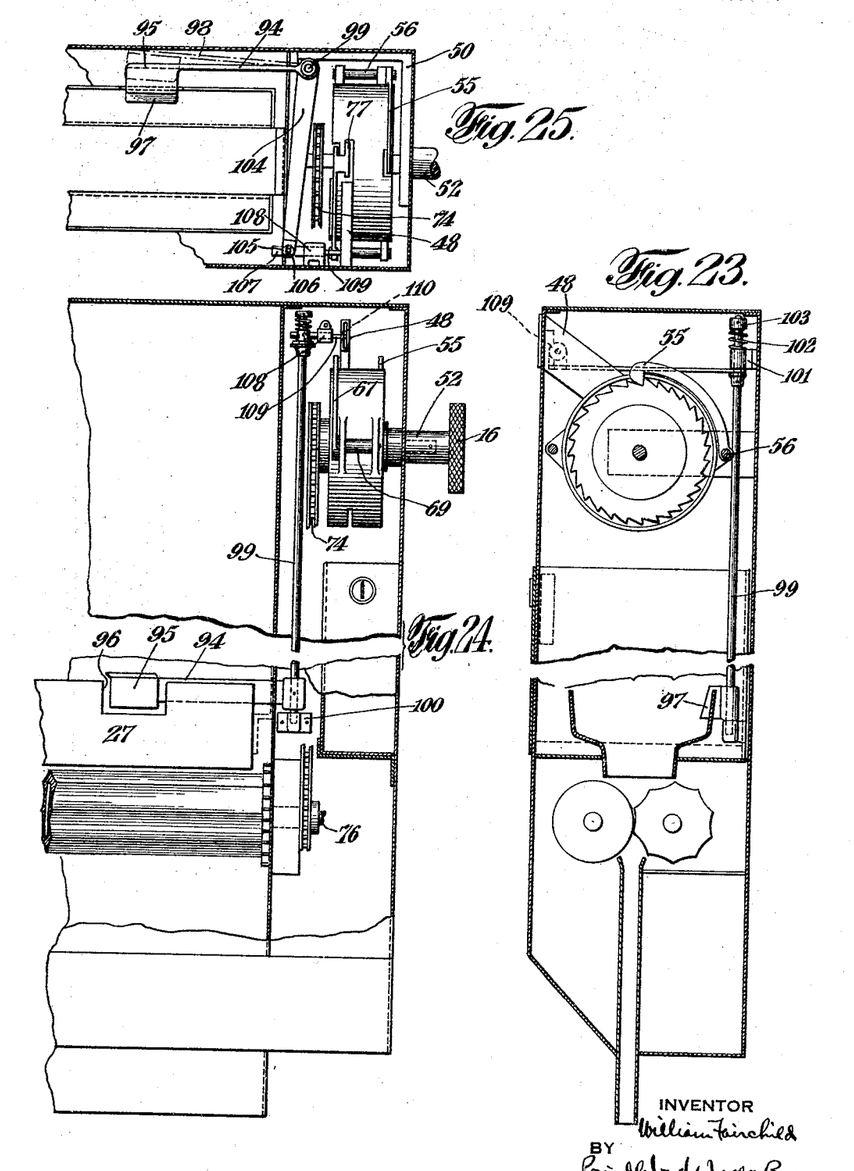
Fig. 23 is a vertical section of the apparatus showing the detail construction of the coin-stop device therein.
Fig. 24 is another vertical detail section showing the same.
Fig. 25 is a horizontal section showing the same.

In the drawings, I have shown a dispensing cabinet comprising a rear member 1 having a plurality of holes 2, 3 and 4 for the introduction of hooks or bolts for attaching the cabinet to any desired surface, as, for example, a wall. This rear member 1 has on the forward face of the rear portion thereof two U-shaped brackets 5 and 6 having free upwardly directed hook-shaped ends 7 and 8 respectively for supporting an inner container for the interfolded towels, as hereinafter described. The rear member, furthermore, has a top portion 9 to cover the top of the cabinet, a left side portion 10 provided with a hinge 11 for attachment thereto of a hinged edge 12 of a front member 13. Further, the rear member 1 has a narrow right side 14 provided with a recess 15 through which an operating handle 16 of the dispensing mechanism is designed to pass. The side portions 10 and 14 are united across the front of the cabinet by a vertical portion 17 and an inclined portion 18 and at the bottom of the cabinet with a bottom portion 19. It will be noted from Fig. 9 that the bottom portion 19 extends only part way across the cabinet and that there is a pocket 20 formed at the end of the bottom wall 19 for receiving a laterally removable money box 21, adapted to be locked in the usual way.

The front member 13 of the cabinet is comprised, further, of a top portion 22, a front cover 23 having secured to the lower end thereof an inclined wall 24 corresponding in position to the wall 18 and, in addition, a side portion 25 having a recess 26 to permit the passage of the handle 16. In order that the contents of the cabinet may be observed at all times, so as to determine the time for refilling, the front member 23 may be provided with a glass window 26a.

Figure 1:
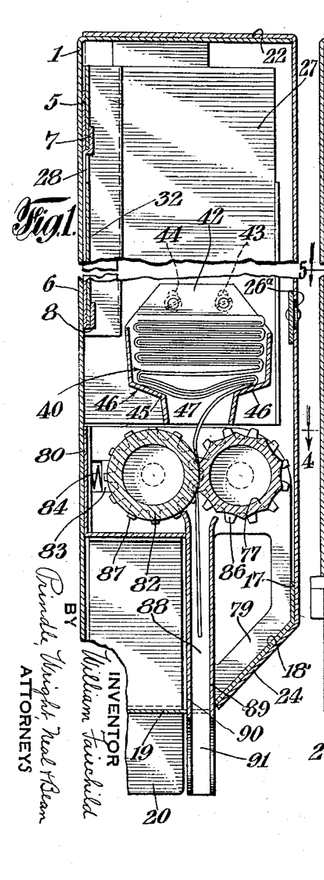
Fig. 1 is a vertical section on line 1—1 of Fig. 4.
Figure 2:
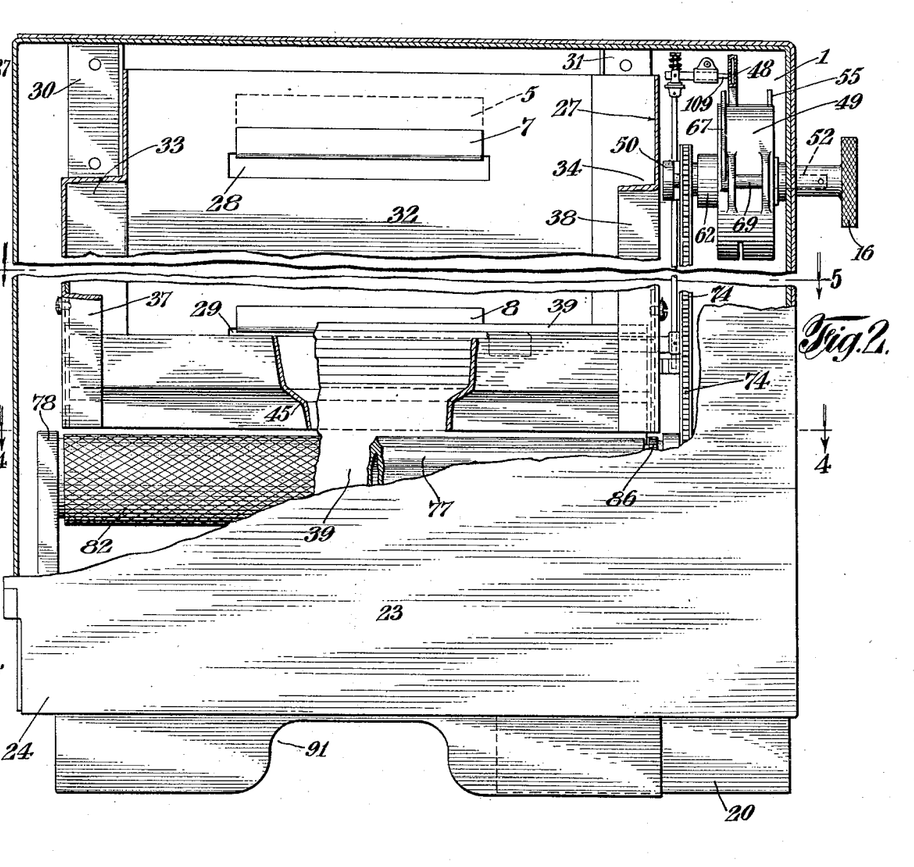
Fig. 2 is a front elevation, partly in section, of the same.
Figures 3, 4, 5, 6:
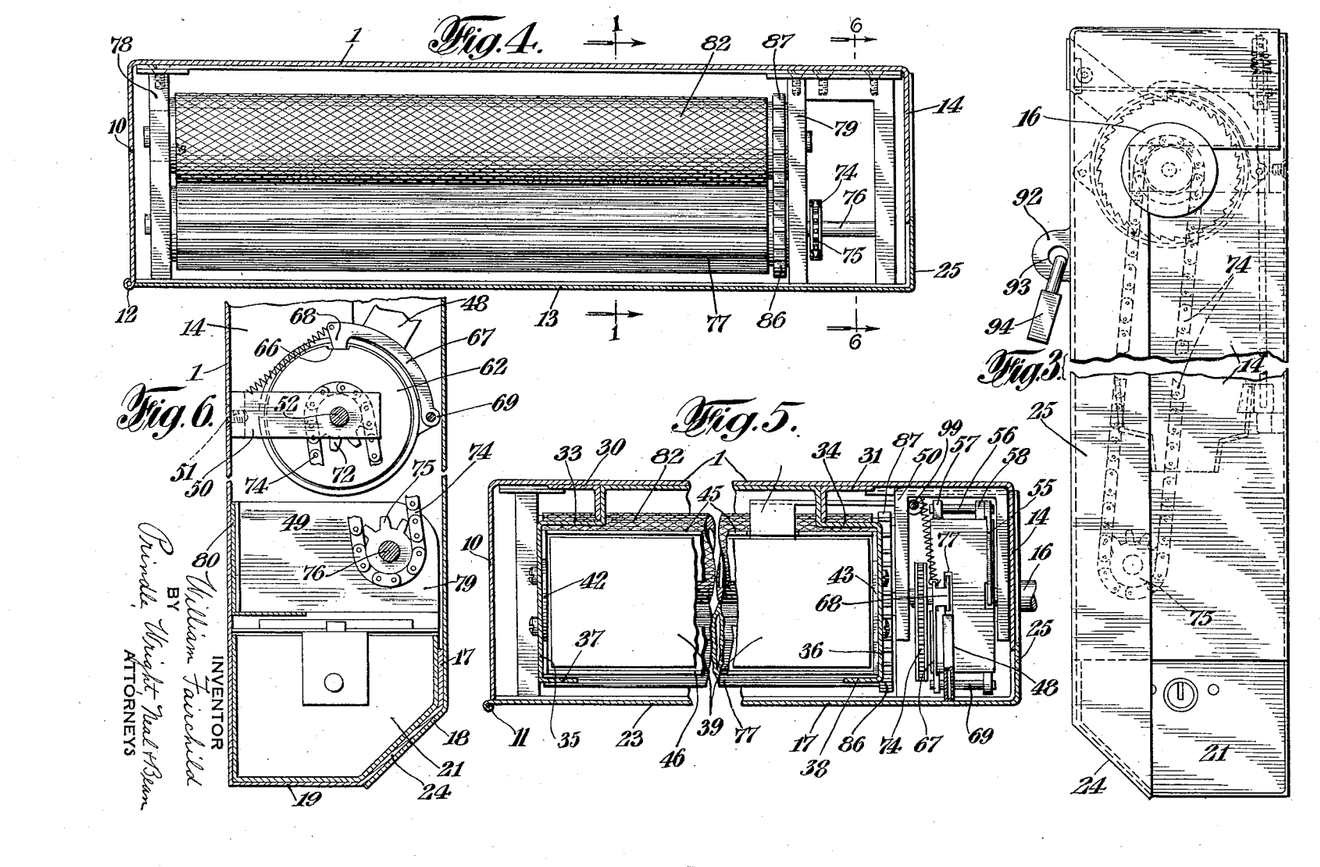
Fig. 3 is a side elevation of the same.
Fig. 4 is a horizontal section taken on line 4—4 of Fig. 2.
Fig. 5 is a horizontal section of the same taken on line 5—5 of Fig. 2.
Fig. 6 is a vertical section taken on line 6—6 of Fig. 4.
Figure 7:
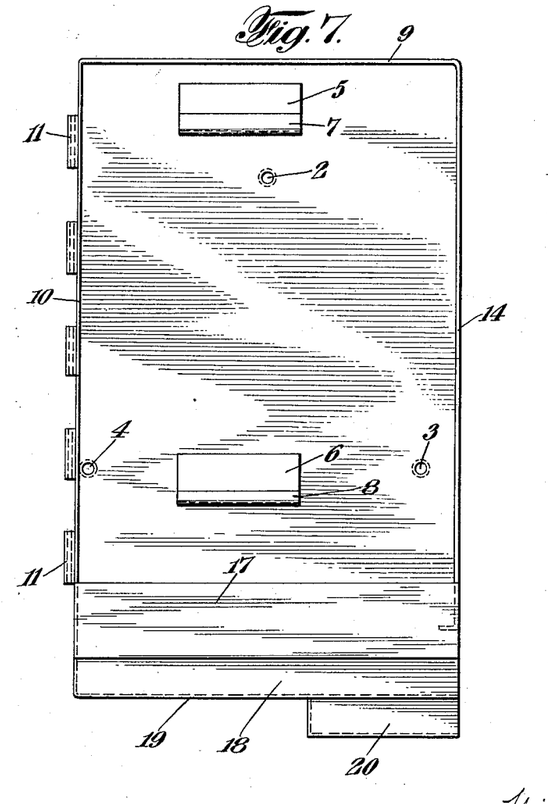
Fig. 7 is a front elevation of the rear portion of the cabinet.
Figure 8:
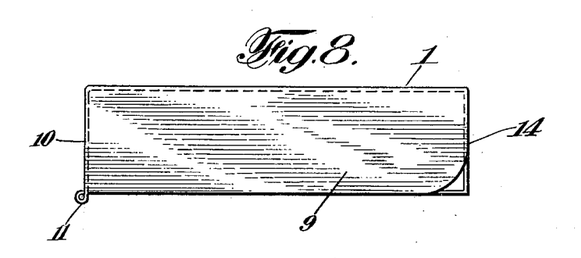
Fig. 8 is a plan view of the same.

Within the interior there is removably supported a towel container 27 having openings 28 and 29 at the rear of the same to fit over the brackets 5 and 6 for supporting the container in place within the cabinet. Also, the container 27 is maintained laterally in its proper position by vertical angle bars 30 and 31, which are riveted to the back of the rear member 1 of the cabinet. As will be noted from Figs. 1 to 5, said container has a rear portion 32 with two angular recesses 33 and 34 therein for receiving the angle bars 30 and 31. Also, the container has side walls 35 and 36 and left and right front portions 37 and 38, the latter of which terminates, as shown in Fig. 2, some distance below the top of the cabinet, to permit the insertion of a packet of interfolded paper towels 39 at this point. It will be noted that these towels are arranged in a packet, each in the form resulting from folding it in the middle and then having the folded towel arranged in Z-form with the two ends of the next succeeding towel extending over both sides of the lowermost fold of the first mentioned towel, as shown in Fig. 1. In other words, these towels are in an interfolded packet and the machine is arranged for dispensing these towels by placing the lowermost fold of each towel in succession within the reach or grasp of the user so that the said towels can be removed one after another from the pack, but only one at a time. For this purpose the packet of towels 39 rests upon a mouth piece 40, which is comprised of two side portions 41 and 42 having slots 43 for the passage of screws 44 to enable them to be attached to the sides 35 and 36 of the towel container, also of converging Z-shaped angle members 45 and 46 having an opening 47 between them for the depending end of the lowermost folded towel. A coin chute 48 projects through the front member of the cabinet 13 at one side thereof and forms a point of introduction of the coin to be inserted for releasing the interfolded towels in succession, one for each coin introduced into the apparatus. The coin chute 48 is formed integrally with a housing 49 which is supported on an U-shaped bracket 50 which is secured to the housing 49 by screws 51, which also serve to pass through the side 14 of the back portion of the cabinet to support the coin-actuating mechanism. Outside of the side portion 14 there is provided the operating handle 16 of the manually operable device for feeding the towels outwardly when the coin has been inserted in the apparatus. Said handle 16 is located on a shaft 52 which passes through the bracket 50, the handle being connected to the shaft by means of a pin 53. Just inside of the bracket 50 there is secured on the shaft 52 a ratchet wheel 54 which cooperates with a pawl 55 pivotally carried on a stud shaft 56 supported in ears 57 and 58 integral with the housing 49. This ratchet wheel 54 fits within a shouldered recess 59 provided in said housing 49, and, furthermore, is provided with a horizontal coin-supporting pin 60 which cooperates with a second coin-supporting pin 61 supported upon a wheel 62 carried loosely on the shaft 52 on the opposite end of said shaft. Said wheel 62 is, furthermore, provided with a flange 64 which fits in a shouldered recess 65 in the inner end of the housing 49, said flange 64 being provided at its outer edge with a notch 66 cooperating with a spring-pressed pivoted stop member 67 having a tongue 68 which extends into said notch 66. The said stop member 67, at its near end, is pivotally supported upon a stud shaft 69 which projects inwardly on the side of the housing 49. Also, at one side of the stop 68 there is a pointed tongue 70 which extends into a hole 71 in the top of the housing 49 into the path of the coin so that when the coin is being moved forwardly in the apparatus it will raise the stop 68 out of the notch 66 to permit the rotation of the parts. In other words, as shown in Fig. 2, the coin, when introduced into the apparatus, will be supported by the two overlapping pins 60 and 61, thereby locking temporarily the handle 16 to the flange 64. The latter, which is connected to a sprocket wheel 72, thereby conveys movement to the towel feeding mechanism when the handle 16 is rotated. However, as the handle 16 is rotated the coin will be caused to follow a spiral groove 73, which is located on the inner face of the housing 49, so that thereby the coin becomes shifted towards the handle 16 until it clears the pin 61 and then falls downwardly into the coin box 21. The movement which has been transmitted to the sprocket 72 is conveyed by a chain 74 to a sprocket 75 on a shaft 76 on which there is carried a fluted roll 77 having ten flutes. It will be noted that the shaft 76 of the fluted roll 77 is supported within two end brackets 78 and 79, which are in turn supported upon a transverse bracket 80 L-shaped in cross-section and having a Z-shaped bracket 81 on the bottom thereof to support the same from the bottom of the cabinet. The fluted roll 77 cooperates with a second, or knurled roll 82 carried in sliding journal bearings 83 at the two ends thereof, which are always pressed forwardly toward the roll 77 by means of springs 84 in recesses 85 in said bearings. The two rolls 77 and 82 are caused to be operated in unison by gears 86 and 87 located on the shafts of said two rolls respectively.

By the movement of the roll 77 through the interlocking of the handle 16 with the coin-receiving wheel 62, the lowermost towel is fed downwardly through a slot 88 between two mouth plates 89 and 90, which are secured at their sides to the brackets 78 and 79, having recesses 91, which are made narrow to prevent such a strong grasp being taken of the towel as would cause the ejection of a second towel from the apparatus simultaneously with the towel being grasped by the user. If desired, the cabinet may be provided with a hasp 92 and an eye 93 adapted to be secured together with a lock 94 for locking the cabinet, except when it is being refilled.

If desired, the device may be equipped with means to prevent the insertion of coins into the apparatus when the magazine of towels is empty. For this purpose I may provide a lever arm 94 having a projection 95 adapted to extend within a recess 96 in the towel container 27. The projection 95 has a beveled face 97 which is moved aside by and rests against the packet of towels when within the container 27, in the position indicated by the dotted line 98. This lever 94 is carried upon a vertical shaft 99 which extends upwardly within the main casing and is supported in journal bearings 100 and 101 attached thereto. A coil spring 102 secured at one end to the journal bearing 101 and at the other end to a sleeve 103 on the shaft 99 normally forces the lever 94 against the packet of towels. Attached to said shaft, furthermore, near the top of the apparatus, there is a lever 104 having a slotted end 105 to receive a pin 106 carried on a plunger 107 operating within a fixed supporting sleeve 108 mounted on the main casing. The plunger 107 has a coin-intercepting pin 109 at one end thereof which extends into a hole 110 in the coin chute 48.

In the operation of my invention it will be assumed that the cabinet contains a supply of the interfolded towels, the lowermost one of which extends between the rolls 77 and 82 but not to a point opposite the hand recess 91. If a penny, or other coin, is inserted into the coin slot 48 the apparatus will be thereby brought into a position for the operation of the dispensing mechanism for bringing the towel down to the level of the hand recess 91. This is accomplished by reason of the fact that the pin 60 carries the coin around until it falls by gravity into the coin box 21, due to the travel of the coin around the spiral slot 73 sufficiently far to clear the pin 61, while simultaneously turning the fluted roll 77 and the knurled roll 82. This brings about a step-like movement of the two rolls 77 and 82, owing to the presence of the flutes on the roll 77, until the lowermost towel projects through the hand recess 91. Thereupon, the user, grasping the towel, pulls the same downwardly, thereby releasing the two upper free ends of the folded towel from around the end of the next succeeding towel at a point between the two rolls. This is accomplished by the pulling of said two free ends of the lowermost towel from between the two rollers and from around the lower folded edge of the next towel, while preventing the rollers from spinning by their own momentum, owing to the presence of the flutes on the roll 60. Therefore, not even by a sudden downward movement of such towel in the grasp of the user could the rolls be caused to move by their momentum sufficiently far to carry downwardly the second towel within the grasp of the user. Consequently, by this mechanism there is always dispensed only a single towel purchased by the coin which has been inserted in the machine. Also, the stop 68, cooperating with the notch 66, will cause the rolls to stop with the pin 61 in the proper place for receiving the coin when the coin has been brought into engagement therewith by the rotation of the pin 60. This accurate positioning of the coin-receiving wheel 62 is aided, furthermore, by the slack of the chain 74 which compensates for any unevennesses in the folds of the towels at the particular point between or opposite to the feeding rolls 77 and 82. It will be understood that the ratchet 54 and pawl 55 will prevent the handle 16 from being operated in the reverse direction.

If desired, as above described, the apparatus may be equipped with means to prevent the insertion of coins when the towel container is empty, which operates to cause the insertion of the pin 109 into the coin chute 48 so as to prevent the introduction of coins when the towel container is empty. This will be evident from the fact that the projection 95, when the towel container still contains towels, occupies the position as shown by the dotted line 98, but when empty moves into the position shown in full lines under the actuation of the spring 102 to project the pin 109 into its coin intercepting position. Also, it will be noted that when the new supply of towels is introduced the beveled face 97 of the projection causes the lever 94 to be moved in the position of the dotted line 98 by reason of the downward movement of the packet of towels against the beveled face 97.

In case it is desired to refill the cabinet, the container therein may be lifted out. Also, in this position of the parts the composite unit mechanism of the feeding rolls 77 and 82 may be readily lifted out of the machine by disconnecting the chain 74 therefrom.

While I have described my invention above in detail I wish it to be understood that many changes may be made therein without departing from the spirit of the same.

I claim:

1. A coin-actuated mechanism comprising a feeding device for dispensing, a manually operable member for moving said feeding device when coupled thereto by a coin, and a stop for positioning the feeding device for the receipt of a coin after the coin has been discharged therefrom, said stop having a tongue projecting into the path of the coin for the release of said stop, said feeding device and manually operable member being provided with overlapping pins for the support of the coin during the operating of the feeding device and spiral means for changing the position of the coin during the feeding operation so that one of said pins is cleared and the coin is discharged.

2. A coin-actuated mechanism comprising a feeding device for dispensing, a manually operable member for moving said feeding device in one direction when coupled thereto by a coin, means for preventing rotation of said member in the other direction, and a stop for positioning the feeding device for the receipt of a coin after the coin has been discharged therefrom, said stop having a tongue projecting into the path of the coin for the release of said stop, said feeding device and manually operable member being provided with overlapping pins for the support of the coin during the operation of the feeding device.

3. A device of the character described comprising a feeding device for dispensing articles, a manually operable member for moving said device when coupled thereto by a coin, disalined pins mounted respectively on said manually operable member and said feeding device for supporting the coin during the feeding operation, and spiral slot ejecting means adapted to shift the position of the coin during the feeding operation so that the coin clears one of said pins and is then discharged.

4. A coin-actuated mechanism comprising a feeding device for dispensing, a manually operated member for moving said feeding device in one direction when coupled thereto by a coin, means for preventing rotation of said members in the other direction, and a stop for positioning the feeding device for the receipt of a coin after the coin has been discharged therefrom, said stop having a tongue projecting into the path of the coin for the release of said stop, said feeding device and manually operable member being provided with overlapping pins for the support of the coin during the operation of the feeding device, and spiral slot ejecting means adapted to shift the position of the coin during the feeding operation so that the coin clears one of said pins and is then discharged.

In testimony that I claim the foregoing, I have hereunto set my hand this 19th day of February, 1929.

WILLIAM FAIRCHILD.